United States Patent
Kawakubo et al.

(10) Patent No.: US 7,174,800 B2
(45) Date of Patent: Feb. 13, 2007

(54) SPEED CHANGE GEAR DRIVE FOR TRANSMISSION

(75) Inventors: Hiroyuki Kawakubo, Wako (JP); Toru Gunji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 10/911,942

(22) Filed: Aug. 4, 2004

(65) Prior Publication Data
US 2005/0087032 A1    Apr. 28, 2005

(30) Foreign Application Priority Data
Aug. 5, 2003    (JP)    ............... 2003-286714

(51) Int. Cl.
F16H 59/00    (2006.01)
F16H 61/00    (2006.01)
F16H 63/00    (2006.01)
(52) U.S. Cl. .................... 74/337.5; 74/325; 74/333
(58) Field of Classification Search ............... 74/337.5, 74/333, 325
See application file for complete search history.

(56) References Cited

U.S. PATENT DOCUMENTS

| | | | | |
|---|---|---|---|---|
| 4,491,031 A | * | 1/1985 | Ooka | ......................... 74/337.5 |
| 4,879,919 A | * | 11/1989 | Sekizaki | .................... 74/337.5 |
| 4,920,825 A | * | 5/1990 | Okazaki et al. | ........... 74/606 R |
| 5,542,309 A | * | 8/1996 | Wenger et al. | .............. 74/337.5 |
| 2004/0139795 A1 | * | 7/2004 | Kawakubo et al. | ........... 73/112 |
| 2004/0238255 A1 | * | 12/2004 | Kawakubo et al. | .......... 180/227 |
| 2005/0081664 A1 | * | 4/2005 | Kawakubo et al. | ......... 74/337.5 |

FOREIGN PATENT DOCUMENTS

| | | | |
|---|---|---|---|
| EP | 1433698 A2 | * | 6/2004 |
| GB | 2384834 | | 8/2003 |
| JP | 63092859 A | * | 4/1988 |
| JP | 6-117533 | | 4/1994 |
| JP | 6-123355 | | 5/1994 |
| JP | 2003-148612 | | 5/2003 |
| JP | 2003-148614 | | 5/2003 |

* cited by examiner

*Primary Examiner*—David D. Le
(74) *Attorney, Agent, or Firm*—Hamre, Schumann, Mueller & Larson PC

(57) ABSTRACT

The invention relates to a speed change gear drive for a transmission that can miniaturize an engine by improving the layout of parts. In particular, the invention relates to a speed change gear drive in which a change spindle is supported by a transmission case and a shift drum supported by the transmission case so that the shift drum can be rotated is driven by the turning of a change arm fixed to the change spindle, a shift fork the position of which is changed by the rotation of the shift drum and a shift fork rod that supports this shift fork are provided, and the change spindle and the shift fork rod are overlapped when the body of an engine is viewed from the side.

3 Claims, 6 Drawing Sheets

SPEED CHANGE GEAR DRIVE FOR TRANSMISSION

CROSS REFERENCE TO RELATED APPLICATIONS

This application is based on JP 2003-286714.

TECHNICAL FIELD OF THE INVENTION

The present invention relates to a speed change gear drive for a transmission of an engine mounted in a vehicle such as a motorcycle.

BACKGROUND OF THE INVENTION

In a conventional type speed change gear drive for a transmission of an engine mounted in a vehicle, the engagement of a group of transmission gears of a transmission is changed and a shift to reduction gear ratio corresponding to predetermined speed is performed by driving a shift drum on the periphery of which cam grooves are formed and suitably changing a position of a shift fork along patterns of the cam grooves. The shift drum is driven by turning a change spindle linked with, among other things, a change pedal. The shift drum is supported by both side walls of a transmission case so that the shift drum can be rotated, the change spindle arranged in parallel with the shift drum is supported by both side walls of the transmission case and its both ends are protruded outside the transmission case. The change pedal and others are coupled to one end of the change spindle and the change arm is fixed to the other end. At the end on the side of the change arm of the shift drum, driving parts including the change arm for rotating the shift drum itself and angle regulating parts for regulating an angle of rotation are collectively arranged. For an example, refer to Japanese Patent 6-117533.

In the above-mentioned known speed change gear drive for a transmission, a shift fork rod that supports the shift fork is arranged in parallel with the shift drum and the change spindle and both of its ends are supported by side walls of the transmission case. Typically, the shift drum, the change spindle and the shift fork rod are arranged in parallel, however, to further miniaturize an engine, alternative layouts are desired.

SUMMARY OF THE INVENTION

The invention provides a speed change gear drive for a transmission that can miniaturize an engine by the improvement of a layout of each part.

One embodiment of the invention relates to a speed change gear drive for a transmission in which a change spindle linked to a change pedal, otherwise known as a shifter, is supported by a transmission case and a shift drum supported by the transmission case so that the shift drum can be rotatably driven by the turning of a change arm fixed to the change spindle. The embodiment is further characterized in that a shift fork, the position of which is changed by the rotation of the shift drum, and a shift fork rod that supports the shift fork are provided. The change spindle and the shift fork rod are overlapped when the body of an engine is viewed from a side.

According to the above-mentioned configuration, the length of the change spindle is reduced, compared with a case that the change spindle is provided between both side walls of the transmission case. Besides, as the change spindle and the shift fork rod are overlapped when the body of the engine is viewed from the side, the speed change gear drive itself is miniaturized.

Another embodiment of the invention relates to a speed change gear drive for a transmission including a shift drum supported by the right and left side walls of a transmission case so that the shift drum can be rotated, a change spindle linked with a change pedal and two shift fork rods that support plural shift forks in partial charge for driving the shift drum by the turning of a change arm fixed to the change spindle. The embodiment is further characterized in that the change spindle is supported by either of a right or left side wall of the transmission case and the change spindle and one shift fork rod are overlapped when the body of an engine is viewed from the side and at least the closest shift fork to the side wall that supports the change spindle out of the shift forks is supported by the other shift fork rod.

According to the above-mentioned configuration, the length of the change spindle is reduced, compared with a case that the change spindle is provided between both side walls of the transmission case. Besides, as the change spindle and one shift fork rod are overlapped when the body of the engine is viewed from the side, the speed change gear drive itself is miniaturized. Further, as the closest shift fork to the side wall that supports the change spindle is supported by the other shift fork rod, a support of this shift fork rod can be provided to a position overlapped with a cam groove of the shift drum, space in the transmission case can be effectively utilized, and the length of the shift fork rod can be reduced.

The invention also relates to an embodiment of the invention including a plurality of pins fitted to the change arm that are provided to one side of the shift drum and a stopper plate for regulating the rotational angle of the shift drum is provided to the other side of the shift drum.

According to the above-mentioned configuration, driving parts such as the pin and the change arm for rotating the shift drum are arranged at one end of the shift drum and an angle regulating part such as the stopper plate for regulating the rotational angle of the shift drum is arranged at the other end. In case the transmission is a cartridge type, the stopper plate can be arranged in a direction in which the transmission is detached, and the pin and the change arm can be arranged on the reverse side.

The change spindle is lightened by the reduction of the change spindle, resistance to the operation of the change arm can be reduced, and control force for a shift can be reduced. As a result of the miniaturization of the speed change gear drive itself, the body of the engine can be miniaturized and a degree of freedom in the design of the body can be enhanced. Further, as the change spindle and the shift fork rod are overlapped when the body of the engine is viewed from the side, space for the arrangement of the speed change gear drive in the transmission case can be effectively utilized and the speed change gear drive can be lightened. Furthermore, each mechanism element can be efficiently arranged by allocating each mechanism element to both ends of the shift drum, compared with a case that the pin and the stopper plate are collectively arranged at one end of the shift drum. As the transmission can be detached without detaching the change arm and the change spindle from the transmission case by configuring so that the stopper plate is arranged in the direction in which the transmission is detached and the pin and the change arm are arranged on the reverse side, the invention is suitable for a cartridge type transmission, the transmission can be easily checked and can be easily replaced with a new transmission, and the maintainability can be enhanced.

DETAILED DESCRIPTION OF THE PREFERRED EMBODIMENT

Figure 1:
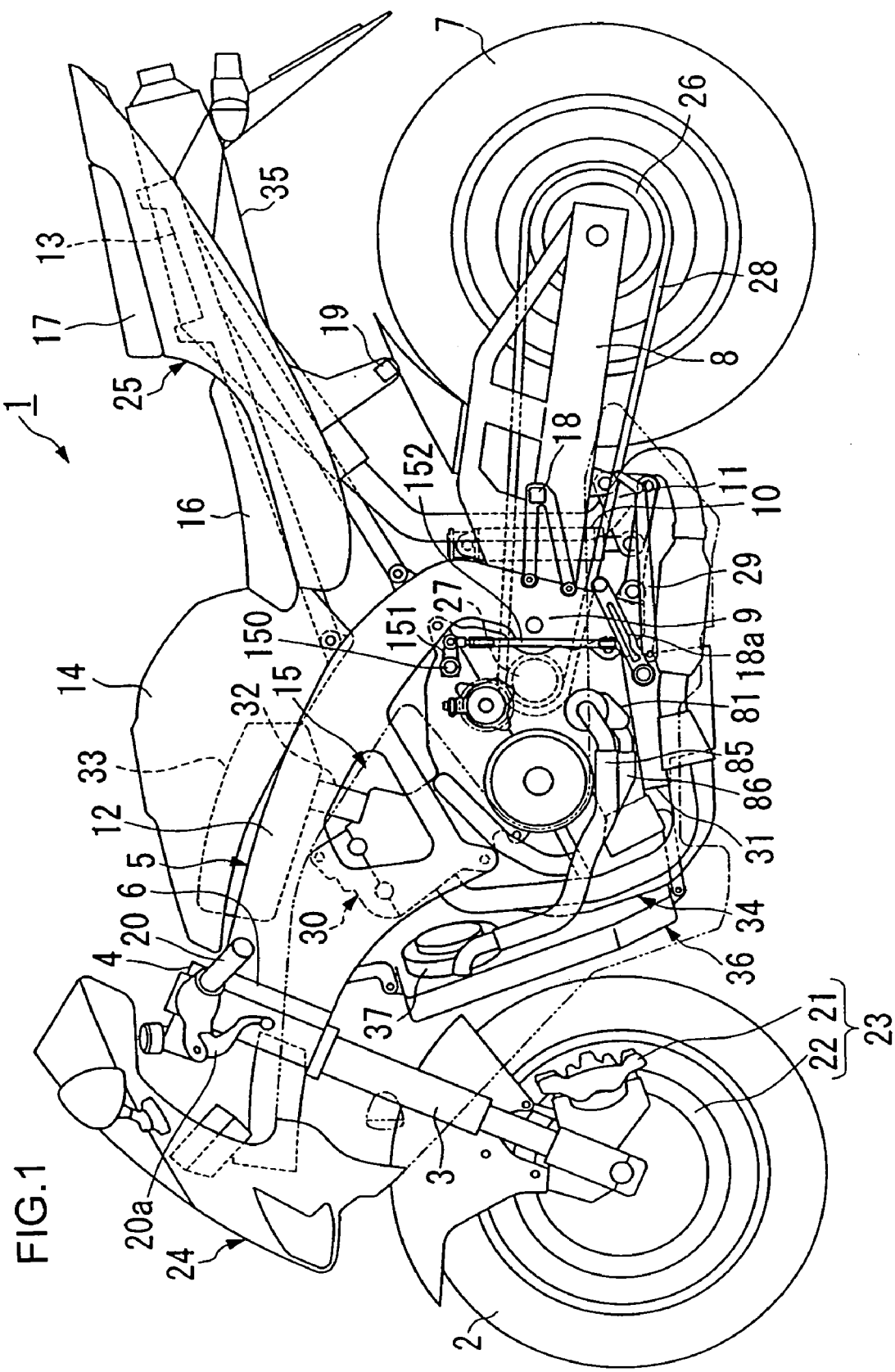
FIG. 1 is a left side view of a motorcycle.

Referring to the drawings, an embodiment of the invention will be described below.

As shown in FIG. 1, a front fork 3 that supports a front wheel 2 of a motorcycle 1 is supported by a head pipe 6 provided to the front end of a body frame 5 via a steering stem 4 so that the front fork can be steered, and a rear fork 8 that supports a rear wheel 7 is supported by a pivot part 9 provided to an intermediate part of the body frame 5 and the body of an engine 15 so that the rear fork can be vertically moved. The upper end of a rear cushion 10 is attached to the vicinity of the pivot part of the rear fork 8 and the lower end of the rear cushion 10 is attached to a lower part of the pivot part 9 and a lower part of the body of the engine 15 via a link mechanism 11.

A main frame 12 of the body frame 5 is extended backward and downward from the upside of the head pipe 6 on the right side and on the left side, the rear end is curved downward and ranges to the pivot part 9. A seat frame 13 of the body frame 5 is connected to the rear of the main frame 12. A fuel tank 14 is arranged on the upside of the main frame 12 and the body 15 of the water-cooled in-line four-cylinder engine 15 (also called the cross-compound four-cylinder engine) is arranged under the main frame 12.

A seat for a rider 16 and a pillion seat for a rear passenger 17 are supported by each seat frame 13 at the back of the fuel tank 14. Right and left steps for the rider 18 are attached to each rear of the right and left pivot parts 9 via each step holder and a step for the rear passenger 19 is attached to each downside of the right and left seat frames 13 via each step holder.

A pair of right and left handlebars 20 are attached to the upper end of the front fork 3. Besides, a brake caliper 21 is attached to the lower end of the front fork 3, a brake rotor 22 corresponding to the brake caliper 21 is attached to the front wheel 2, and a front braking device 23 is formed. A rear braking device having the similar configuration to that of the front braking device 23 of the front wheel 2 is provided to the right side of the rear wheel 7.

A grip of the right handlebar 20 (not shown) functions as a throttle grip and a front brake lever is arranged in front of the grip. Besides, a clutch lever 20a is arranged in front of the grip of the left handlebar 20. A brake pedal which operates upon the rear braking device is arranged in front of the right step 18 (not shown). Besides, a change pedal 18a which operates upon the shift of a transmission 50 described later is arranged in front of the left step 18.

The front of the body of the motorcycle 1 is covered with a front cowl 24 and the circumference of the seat frame 13 is covered with a rear cowl 25. A rear sprocket 26 is attached to the left side of the rear wheel 7, a drive chain 28 is wound on the rear sprocket 26 and a drive sprocket 27 arranged on the rear left side of the body of the engine 15 and the driving force of the engine is transmitted to the rear wheel 7. A side stand 29 that can be stored is arranged in a lower part on the left side of the body frame 5 and the motorcycle 1 can be supported by using the side stand 29 in a state in which the motorcycle stands with the body inclined on the left side.

The body of a cylinder 30 of the body of the engine 15 is arranged above a crankcase 31 in a state in which the body of the cylinder is rather inclined forward. A throttle body 32 corresponding to each cylinder is connected to the rear of the body of the cylinder 30 and each throttle body 32 is connected to an air cleaner case 33 arranged between the main frame 12 and the fuel tank 14. An exhaust pipe 34 corresponding to each cylinder is connected to the front of the body of the cylinder 30, is curved downward from a front wall of the body of the cylinder 30, is curved upward at the back of the pivot part 9 after the exhaust pipe passes the downside of the crankcase 31, and is connected to a silencer 35 supported by the seat frame 13.

A radiator 36 is arranged in front of the exhaust pipe 34 in a state in which the radiator is rather inclined forward like the body of the cylinder 30. The radiator 36 is a round type the front side of which is concavely curved and is vertically provided from the upside of the body of the cylinder 30 to the downside of the crankcase 31. A pair of right and left radiator fans 37 are attached on the upper back side of the radiator 36. To secure the body banking angle and the space at the rider feet, the radiator 36 is narrowed in the direction of the width of the body toward the downside.

Figure 2:
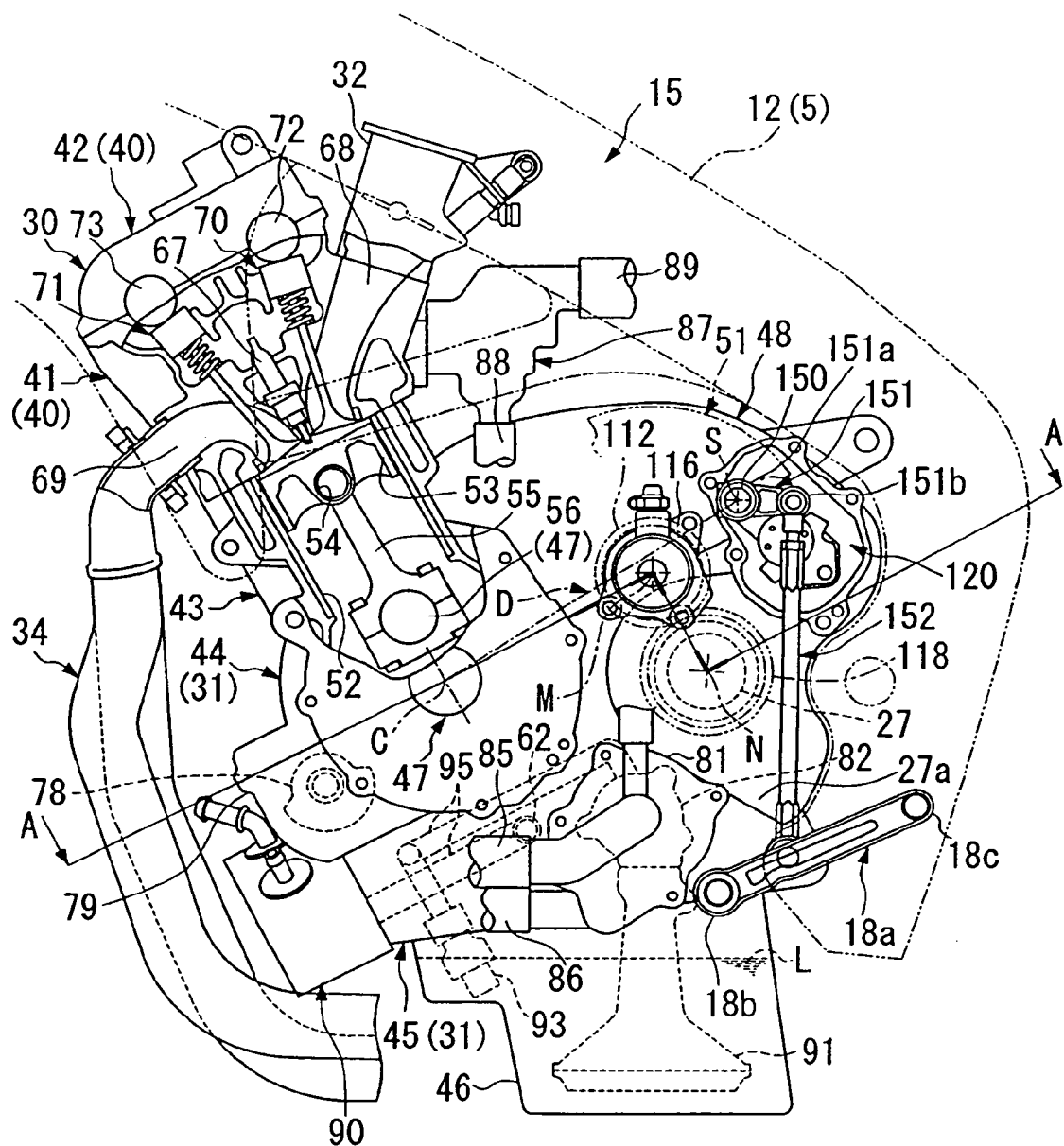
FIG. 2 is a side view of an engine shown in FIG. 1.

As shown in FIG. 2, the body of the engine 15 is provided with a cylinder head 40, a cylinder block 43 and the crankcase 31 which are main components of the body of the cylinder 30. The cylinder head 40 is partitioned into the body of a head 41 and a head cover 42 and the crankcase 31 is partitioned into an upper case 44 and a lower case 45. The upper case 44 of the crankcase 31 is integrated with the cylinder block 43. An oil pan 46 is attached to the downside of the lower case 45.

Figure 3:
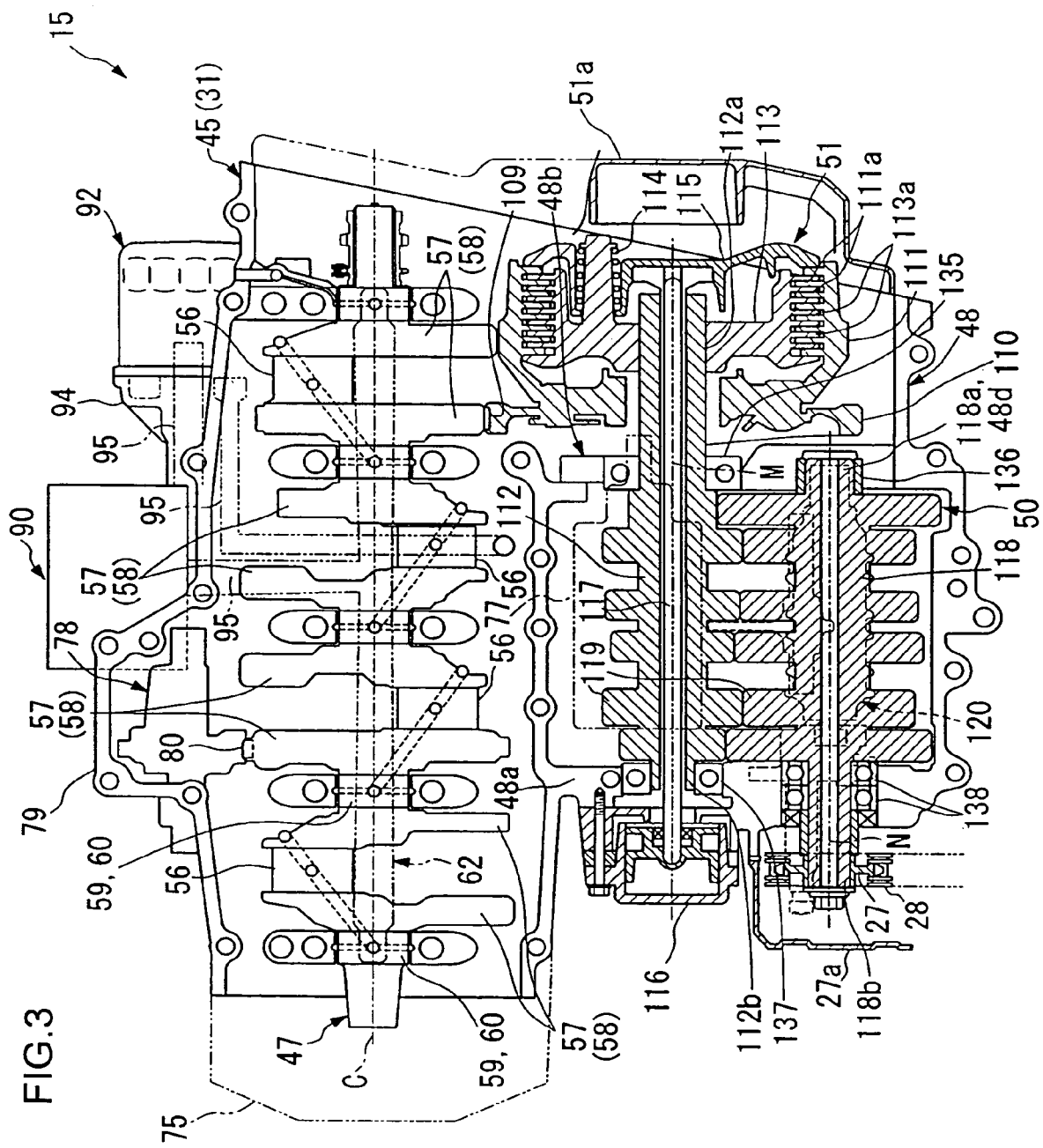
FIG. 3 is a sectional view of the engine along a line A–A of FIG. 2.

To explain also referring to FIG. 3, a crankshaft 47 having an axis C parallel to the direction of the width of the body is arranged in the crankcase 31. A transmission case 48 ranges to the rear of the crankcase 31, and a transmission 50 and a clutch mechanism 51 are arranged in the transmission case 48.

In the cylinder block 43, four cylinders 52 are arranged in the direction of the width of the body and a piston 53 is fitted into each cylinder 52 so that the piston can be slid. A connecting rod 55 is coupled to each piston 53 via a piston pin 54 rotatably and a big end of the connecting rod 55 is coupled to a crankpin 56 of the crankshaft 47 rotatably. Each crankpin 56 is supported by a pair of crank arms 57 and a counterweight 58 is integrated with a part on the reverse side to the crankpin 56 of each crank arm 57. Each journal 59 provided between both ends of the crankshaft 47, between each crank arm 57 and on the axis C is supported by a bearing 60 provided to the upper case 44 and the lower case 45 so that the journal can be rotated, and the reciprocation of the piston 53 is converted to a rotary motion with the axis C in the center.

A main oil gallery 62 extended in the direction of the width of the body between the vicinities of both ends of the crankshaft 47 is formed on the downside of the crankshaft 47 in the lower case 45. The main oil gallery 62 communicates with an oil path suitably formed on the crankshaft 47 and each bearing 60, and engine oil is supplied from the main oil gallery 62 to each bearing 60 and the peripheral surface of each crankpin 56.

In the body of the head 41 of the cylinder head 40, an ignition plug 67 is screwed so that the ignition plug is opposite to each combustion chamber, and an intake port 68 and an exhaust port 69 respectively connecting each combustion chamber and the outside are formed. The throttle body 32 is connected to an opening on the side of the outside of each intake port 68 via an insulator and the exhaust pipe 34 is connected to an opening on the side of the outside of each exhaust port 69. Besides, each opening on the side of the combustion chamber of each intake port 68 and each exhaust port 69 can be opened or closed by the operation of an intake valve 70 and an exhaust valve 71, and a camshaft on the intake side 72 and a camshaft on the exhaust side 73 respectively for operating each valve are arranged over each intake valve 70 and on each exhaust valve 71. Each camshaft 72, 73 is hollow, engine oil flows in its hollow part, and is supplied from an oil hole to each sliding surface.

A primary drive gear 109 is provided to the periphery of the crank arm 57 on the left side that supports the crankpin 56 at the end of the right side and the counterweight 58 integrated with the crank arm, and is engaged with a primary driven gear 110 of the clutch mechanism 51 arranged on the right side of the transmission case 48. The clutch mechanism 51 is a so-called multiple disc clutch provided with the primary driven gear 110, a clutch outer 111 rotated integrally with it, a clutch center 113 housed in the clutch outer 111 and rotated integrally with a main shaft 112 of the transmission 50 and plural friction plates 111a, 113a on the side of the clutch outer 111 and on the side of the clutch center 113.

A pressure plate 115 pressed by plural clutch springs 114 is attached to the clutch center 113, both friction plates 111a, 113a are mutually pressed by the pressure plate 115, and the clutch mechanism 51 is turned a state in which it can transmit power. A slave cylinder 116 arranged on the left side of the transmission case 48 is operated by the operation of the clutch lever 20a, both friction plates 111a, 113a are separated by moving the pressure plate 115 via a rod 117 inserted into the main shaft 112 against the pressure of the clutch spring 114, and power transmission by the clutch mechanism 51 is turned off.

The transmission 50 is provided with the main shaft 112 having an axis M parallel to the axis C and supported by the transmission case 48 so that the shaft can be rotated and a counter shaft 118 having an axis N parallel to the axis M. The main shaft 112 is arranged in a coaxial position with the clutch mechanism 51, the clutch center 113 of the clutch mechanism 51 is fitted and fixed to the right end of the main shaft 112, and the power of the crankshaft 47 is transmitted. The power transmitted to the main shaft 112 is reduced at predetermined reduction gear ratio via a group of transmission gears 119 provided to both shafts 112, 118 and is transmitted to the counter shaft 118.

The group of transmission gears 119 is a so-called constant-mesh type which is composed of gears equivalent to the number of speeds and attached to both shafts 112, 118 and in which the corresponding gears are constantly engaged between both shafts 112, 118. For each gear attached to both shafts 112, 118, there are a freely rotatable free gear for a shaft and a slide gear engaged with the shaft via splines. A convex dog is provided to one of each gear in an axial direction and a fitting part for fitting to this is provided to the other. The details of the group of transmission gears 119 are not shown.

The rotation of a free gear to be one of a pair is regulated by sliding an arbitrary slide gear from a neutral state (a state in which no power transmission is performed between the main shaft 112 and the counter shaft 118) of the transmission 50, and power is transmitted from the main shaft 112 to the counter shaft 118 at predetermined reduction gear ratio corresponding to each speed. The slide of the slide gear is performed by a speed change gear drive (a speed change gear drive for a transmission) 120 described later. The main shaft 112 and the counter shaft 118 are both hollow, engine oil flows in its hollow part and is supplied from an oil hole and others to each sliding surface, the group of transmission gears 119 and the clutch mechanism 51.

The drive sprocket 27 is attached to the left end of the counter shaft 118 and the driving force of the engine is transmitted to the main shaft 112 via the primary drive gear 109, the primary driven gear 110 and the clutch mechanism 51 from the crankshaft 47, and is transmitted to the rear wheel 7 via the drive chain 28 from the drive sprocket 27 fixed to the left end of the counter shaft 118 after the driving force is transmitted to the counter shaft 118 via the group of transmission gears 119. A sprocket cover 27a covering the drive sprocket 27 from the left side of the body is attached to the transmission case 48.

An AC generator provided with a rotor integrally rotated with the crankshaft 47 and a stator supported by a generator cover 75 is provided to the left end of the crankshaft 47, and an ignition timing detection mechanism provided with a pulser rotor integrally rotated with the crankshaft 47 and a pulse generator supported by a point cover is provided to the right end of the crankshaft 47 (in FIG. 3, only the generator cover 75 is shown). A clutch cover 51a covering the clutch mechanism 51 from the right side of the body is attached to the transmission case 48.

A substantially cylindrical starter motor 77 is arranged in parallel with the axis C at the back of the body of the cylinder 30 and in an upper part of the upper case 44 of the crankcase 31. A starter motor driven gear is provided to the right end of the crankshaft 47 on the axis C via a one-way clutch. A pinion gear is provided to the drive shaft of the starter motor 77, and the pinion gear and the starter motor driven gear are engaged via a group of starter gears. When power is fed to the starter motor 77, the crankshaft 47 can be rotated only in a direction in which the engine is started (in FIG. 3, only the starter motor 77 is shown).

A water pump 81 is arranged on the left side of the lower case 45. The water pump 81 is arranged coaxially with an oil pump 82 in the direction of the width of the body and is operated according to the rotation of the crankshaft 47 together with the oil pump 82. A radiator hose on the outflow side 85 communicating with a tank on the outflow side of the radiator 36 and a cooling water hose 86 communicating with the water jacket of the cylinder head 40 and the cylinder block 43 are connected to the water pump 81 (see FIG. 1). A thermostat 87 is connected to the rear of the cylinder head 40 and a bypass hose 88 is arranged between the thermostat 87 and the water pump 81. A radiator hose on the inflow side 89 communicating with a tank on the inflow side of the radiator 36 is connected to an outlet for cooling water of the thermostat 87.

When the water pump 81 is operated, cooling water led from the radiator 36 via the radiator hose on the outflow side is taken in the body of the cylinder 30 via the cooling water hose 86, cools each part and is repeatedly circulated in the body of the cylinder 30 via the similar path after the cooling water is returned to the radiator 36 via the thermostat 87 and the radiator hose on the inflow side 89. At this time, if the temperature of the cooling water that passes the thermostat 87 is fixed temperature or cooler, the cooling water is sent to the water pump 81 via the bypass hose 88 from the thermostat 87 and is circulated without passing the radiator 36. When the temperature of cooling water that passes the thermostat 87 exceeds the fixed temperature, the radiator fan 37 is operated to forcedly cool the cooling water.

A water-cooled oil cooler 90 is attached to the front wall of the lower case 45 on the slightly right side of the center in the direction of the width of the body. The oil cooler 90 shares cooling water with the body of the engine 15, the cooling water is taken via a branch pipe from the cooling water hose 86, is led into the radiator hose on the outflow side 85 via the branch pipe, and is returned to the water pump 81.

A single-shaft secondary balancer 78 is arranged on the slightly left side of the center in the direction of the width of the body in the front of the crankcase 31 so that the secondary balancer is adjacent to a left upper part of the oil cooler 90. The single-shaft secondary balancer 78 is rotated by the number of revolutions equivalent to the double of that of the crankshaft 47 to reduce the secondary vibration of the engine, has an axis D parallel to the axis C, and is housed in a housing 79 having an axis parallel to the axis C and formed by swelling a part of the lower case 45 forward. A balancer drive gear 80 for rotating the single-shaft secondary balancer 78 is provided to the periphery of the left crank arm 57 that supports the second crankpin 56 from the left side and the counterweight 58 integrated with it.

The oil pump 82 for force-feeding engine oil to suitable locations in the body of the engine 15 is arranged in the lower part of the crankcase 31. The oil pump 82 is linked with the main shaft 112 via a chain, and the operation is started according to the rotation of the crankshaft 47. Engine oil L is reserved in the oil pan 46 fixed to the lower part of the lower case 45 and an oil strainer 91 is dipped in the reserved engine oil L.

Engine oil sucked from the oil strainer 91 by the operation of the oil pump 82 is force-fed to each oil passage 95 suitably formed in the lower case 45. Each oil passage 95 communicates with an oil gallery in the body, of the engine 15 including the main oil gallery 62 and an oil jet, and the engine oil is supplied to each part in the body of the engine 15 after the engine oil is filtered in an oil filter 92 and is cooled in the oil cooler 90. The engine oil supplied to the body of the engine 15 is returned into the oil pan 46 by a natural drop and others, is reserved there, and is repeatedly circulated in the body of the engine 15 via the above-mentioned path. In case the oil pressure of the engine oil reaches a predetermined value in the circulation of the engine oil, an oil relief valve 93 is operated and the oil pressure is adjusted.

A holder 94 from which the oil filter 92 can be detached in the direction of the width of the body from the right side of the body is provided to the right side of the front wall of the lower case 45. The oil filter 92 is an existing cartridge type filter housing a filter element in its cylindrical case having a bottom and is attached by screwing the oil filter into the holder 94, turning the oil filter 92 itself from the right end of the body of the engine 15 (see FIG. 3).

Figure 4:
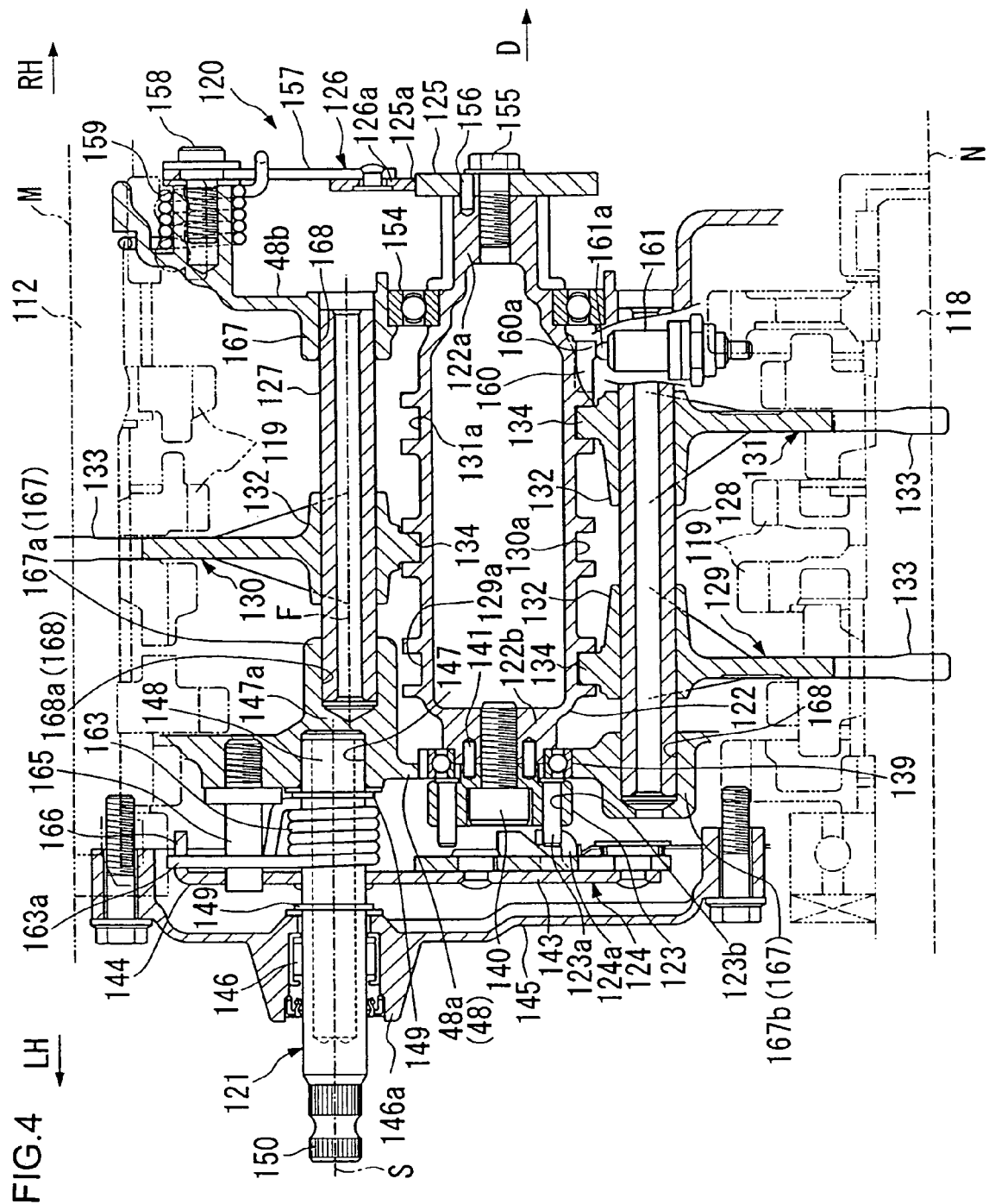
FIG. 4 is a sectional view showing a speed change gear drive for a transmission.

Referring to a sectional view shown in FIG. 4, a speed change gear drive 120 will be described below. "RH" in FIG. 4 shows a right direction of the body and "LH" shows a left direction of the body.

The speed change gear drive 120 is provided with a Change spindle 121 supported by a transmission case 48 and a change arm cover 145 so that the change spindle can be rotated, a shift drum 122 which is supported by the transmission case 48 so that the shift drum can be rotated and on the periphery of which a plurality of cam grooves 129a, 130b, 131c are formed, a drum center 123 which is coaxially fixed to the left end of the shift drum 122 and in which plural shift drum pins 123a are axially provided, a change arm 124 the base side of which is fixed to the change spindle 121 and in which a fitting pawl 124a provided to the end side is fitted to the shift drum pin 123a, a stopper plate 125 which is coaxially fixed to the right end of the shift drum 122 and on the periphery of which plural grooves 125a are provided, a stopper roller assembly 126 the base side of which is supported by the transmission case 48 so that the stopper roller assembly can be rocked for elastically touching a stopper roller 126a provided to the end side to the groove 125a of the stopper plate 125 and regulating a rotational angle of the shift drum 122, two shift fork rods 127, 128 supported by the transmission case 48 and plural (three in this embodiment) shift forks 129, 130, 131 supported by each shift fork rod 127, 128 so that the shift forks can be axially slid.

The change spindle 121, the shift drum 122 and each shift fork rod are arranged so that each axis is parallel to the axes M, N of the main shaft 112 and the counter shaft 118. The change spindle 121 is a shaft for turning the change arm 124 and the axis is S. The shift fork 130 is supported by the shift fork rod 127, and the shift forks 129, 131 are supported by the shift fork rod 128. For each cam groove 129a, 130b, 131c, the cam groove 129a is formed on the left side in an axial direction of the shift drum 122, the cam groove 130a is formed substantially in the center, and the cam groove 131a is formed on the right side.

Figure 6:
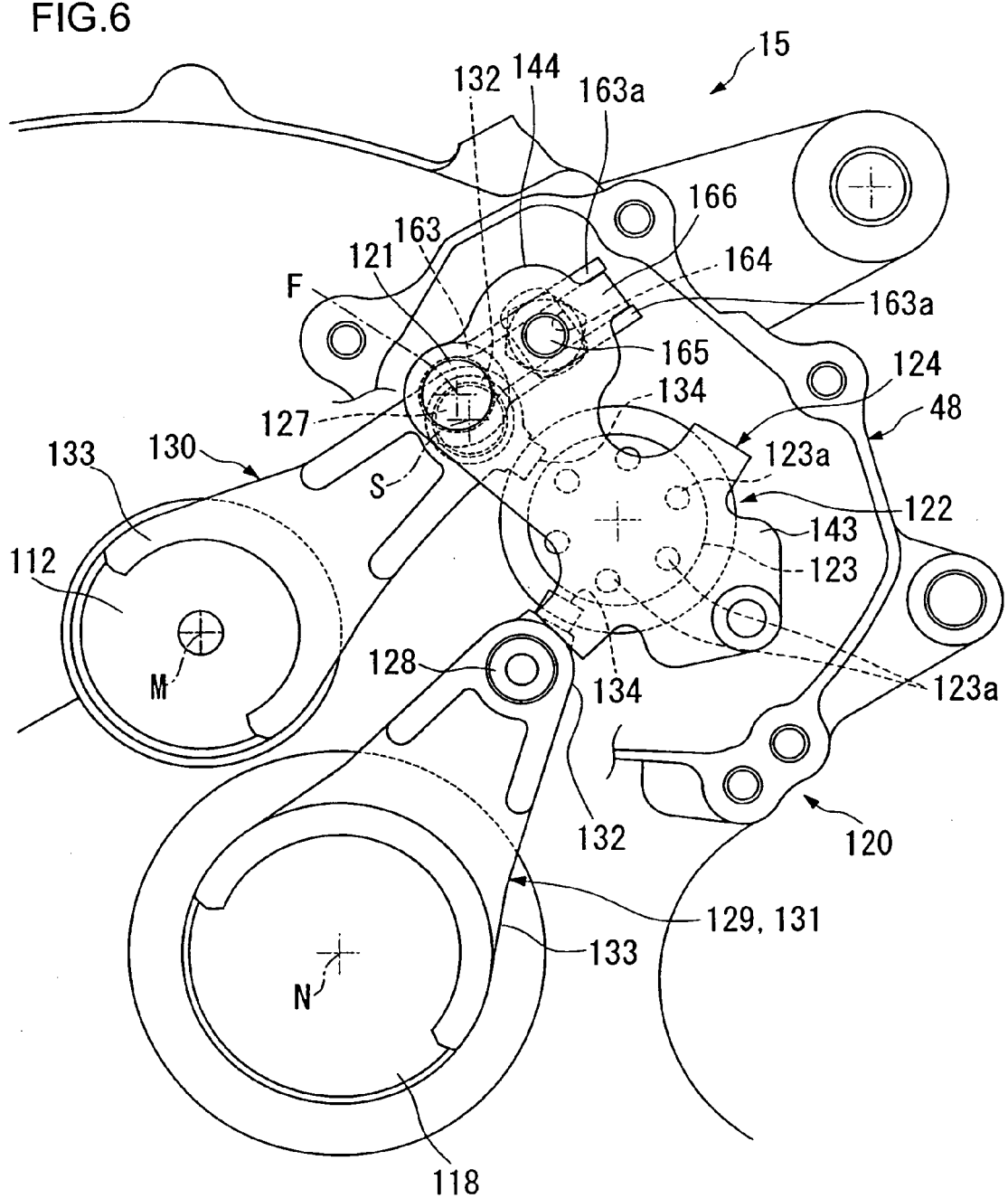
FIG. 6 is a left side view of the speed change gear drive.

Each shift fork 129, 130, 131 is provided with a cylindrical part 132 into which the shift fork rod 127 or 128 is inserted, a fork part 133 which is extended toward the main shaft 112 or the counter shaft 118 from the periphery of the cylindrical part and the two-forked end of which is suitably engaged with each gear and a sliding portion 134 protruded from the periphery of the cylindrical part 132 and engaged with the corresponding cam groove 129a, 130b, 131c of the shift drum 122 (see FIG. 6). The sliding portion 134 of each shift fork 129, 130, 131 is engaged with each cam groove 129a, 130b, 131c. When the change spindle 121 and the change arm 124 are rotated, the shift drum 122 is rotated via the shift drum pin 123a and others, the shift forks 129, 130, 131 are moved in an axial direction of the shift fork rods 127, 128 along patterns of each cam groove 129a, 130b, 131c of the shift drum 122, and a predetermined slide gear of a group of transmission gears 119 is slid.

A transmission 50 is configured as a so-called cartridge type transmission which can be detached from the transmission case 48 as one unit composed of the main shaft 112, the counter shaft 118, a group of transmission gears 119 and others.

Figure 5:
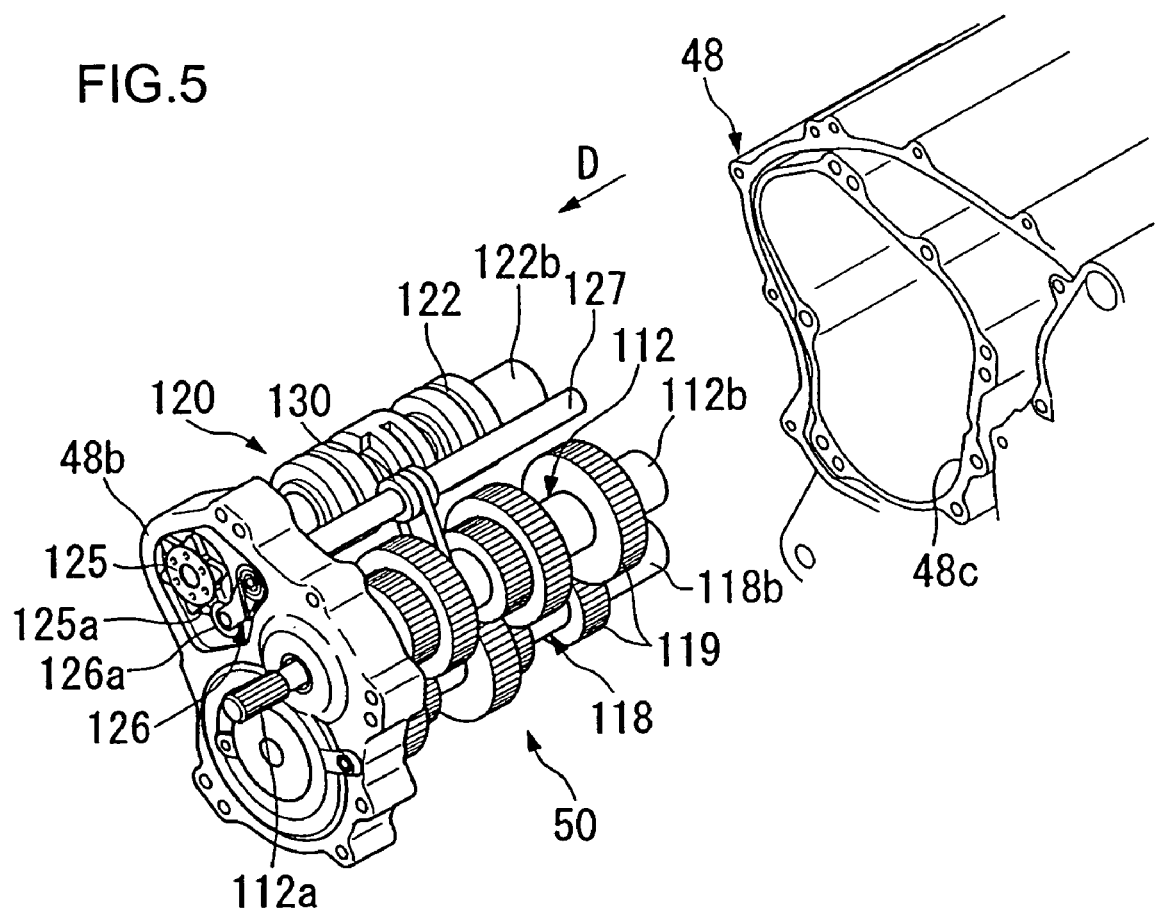
FIG. 5 is a perspective view of a cartridge type transmission.

To explain also referring to FIG. 5, the left side wall 48a of the transmission case 48 is integrated with the case itself, while the right side wall is configured so that it can be detached from the case itself. The right side wall of the transmission case 48 functions as a transmission holder 48b that holds the transmission 50 as one unit, and the transmission holder 48b and the transmission 50 can be detached, from the right side of the body. When the transmission 50 is installed in the transmission case 48, a right opening 48c of the case itself is closed by the transmission holder 48b. FIG. 5 shows the transmission case 48 when it is viewed from the right upper front side and shows a state in which the transmission 50 is pulled out of the transmission case 48 in a direction shown by an arrow D (in a right direction of the body).

The right end 112*a* of the main shaft 112 is supported via a bearing 135 by the upper front side of the transmission holder 48*b*, and the right end 118*a* of the counter shaft 118 is supported via a bearing 136 by the lower front side of the transmission holder 48*b*. The right end 112*a* of the main shaft 112 pierces the transmission holder 48*b*, is protruded rightward, and the clutch center 113 of the clutch mechanism 51 is fixed to the protruded part. The right end 118*a* of the counter shaft 118 is supported in a state in which the right end is inserted into a dead-end concave portion 48*d* formed in the transmission holder 48*b* (see FIG. 3).

In the meantime, in a state in which the transmission 50 is attached to the transmission case 48, the left end 112*b* of the main shaft 112 is supported by the left wall 48*a* of the transmission case 48 via a bearing 137, and the left end 118*b* of the counter shaft 118 is supported by the left wall 48*a* via a bearing 138. The left end 118*b* of the counter shaft 118 pierces the left wall 48*a*, is protruded leftward and the drive sprocket 27 is attached to the protruded part. The slave cylinder 116 is arranged outside the left wall 48*a* on the left side of the left end 112*b* of the main shaft 112 (see FIG. 3).

The left end 122*b* of the shift drum 122 is supported by the left wall 48*a* of the transmission case 48 via a bearing 139. A drum center 123 is fixed to the left end face of the shift drum 122 by a bolt 140 so that the drum center is matched with the left end face. A knock pin 141 is inserted into a part in which the drum center 123 and the left end 112*b* are matched, and the drum center 123 and the shift drum 122 are integrally rotated.

The drum center 123 is cylindrical when it is viewed from the side, is coaxially fixed with the shift drum 122, and is provided with plural (six in this embodiment) through holes 123*b* substantially at an equal interval on a concentric circle (see FIG. 6). The through hole 123*b* is provided in parallel with the axis of the shift drum 122, and the shift drum pin 123*a* inserted into each through hole from the inside of the case toward the outside (the left from the right side of the body) is protruded toward the left side of the body from the left end face of the drum center 123. That is, a direction in which the shift drum pin 123*a* is protruded is equivalent to a direction reverse to the direction shown by the arrow D in the drawings in which the transmission 50 is detached.

The change arm 124 is a plate perpendicular to the change spindle 121, is located on the right side of the body of the drum center 123 and the shift drum pin 123*a* and is arranged outside the left wall 48*a*. The change arm 124 is provided with a long arm part 143 extended diagonally downward and backward toward the shift drum 122 from the base fixed to the change spindle 121 and a short arm part 144 protruded diagonally upward and backward so that the short arm part is substantially at a right angle with the long arm part (see FIG. 6). The fitting pawl 124*a* cut toward the drum center 123 is formed on the side of the end of the long arm part 143. At least one of each shift drum pin 123*a* can be fitted to the fitting pawl 124*a* from a right direction of the body and the fitting can be released toward the right direction of the body.

A change arm cover 145 covering the circumference of the change arm 124 from the left side of the body is attached to the left wall 48*a* of the transmission case 48. A hub 146*a* protruded toward the left side of the body is formed on the change arm cover 145 and the change spindle 121 that pierces the hub 146*a* is supported by the change arm cover 145 via a needle bearing 146. The side of the base of the change spindle 121 is extended to the right side of the body and the base 148 of the change spindle 121 is supported by a dead-end concave portion 147 provided to the left side wall 48*a*. The end of the change spindle 121 is protruded on the left side of the body from the change arm cover 145. The movement in the axial direction of the change spindle 121 is regulated by two snap rings 149, 149 and the movement to the right side of the body of the change spindle 121 is regulated by the dead-end concave portion 147.

A shift lever 151 is fitted and fixed to the end 150 protruded from the change arm cover 145 of the change spindle 121 as shown in FIG. 2 and is linked with the change pedal 18*a* via a shift rod 152.

Concretely, a boss 151*a* which is the base of the shift lever 151 is fitted to the end 150 of the change spindle 121 via serrations. A slit is provided to the boss 151*a*, and the shift lever 151 and the change spindle 121 are fixed by clamping the slit using a bolt. The side of the end of the shift lever 151 is extended backward and the upper end of the shift rod 152 is coupled to the end 151*b* so that the shift rod can be turned.

In the meantime, the base 18*b* of the change pedal 18*a* is supported by the lower end of the pivot part 9 turnably and the side of the end is extended diagonally backward and upward. The end 18*c* of the change pedal 18*a* is arranged in a position which can be operated by a rider's left foot put on the left step 18. The lower end of the shift rod 152 is coupled between the base 18*b* and the end 18*c* of the change pedal 18a so that the shift rod can be turned and a shift link mechanism by the change pedal 18*a*, the shift rod 152 and the shift lever 151 is formed. The change spindle 121 and the change arm 124 are rotated by a fixed angle via the shift rod 152 and the shift lever 151 by the operation of the change pedal 18*a*.

The right end 122*a* of the shift drum 122 pierces the transmission holder 48*b* and is supported by the transmission holder 48*b* via a bearing 154. A stopper plate 125 is fixed to the right end face of the shift drum 122 by a bolt 155 so that the stopper plate is matched with the right end face of the shift drum. A knock pin 156 is inserted into a part in which the stopper plate 125 and the right end 122*a* are matched, and the stopper plate 125 and the shift drum 122 are integrally rotated.

A plurality of curved grooves are formed on the stopper plate 125 along the periphery of the disc-like body and the stopper plate substantially becomes a stellar shape (see FIG. 5). Plural (six in this embodiment) grooves are provided corresponding to the arrangement of the shift drum pins 123*a* and a stopper roller 126*a* of a stopper roller assembly 126 is elastically touched to one groove of them. A lever member 157 of the stopper roller assembly 126 is attached to a bolt 158 protruded from the transmission holder 48*b* so that the lever member can be reciprocated, and the stopper roller 126*a* is attached to the end of the lever member 157 so that the stopper roller can be rotated. A coiled return spring 159 is wound on the bolt 158 and the lever member 157 is pressed by the return spring 159 so that the stopper roller 126*a* is pressed upon the stopper plate 125.

A cam face 160 is formed in a part on the left side (inside the case) of the body from the bearing 154 of the shift drum 122. The cam face 160 is provided with a protruded part (cam) 160*a* corresponding to the neutral of the transmission 50. A sensor 161 that detects the rotational position of the shift drum 122 is attached to the transmission case 48 in a position corresponding to the cam face 160. A sensing pin 161*a* at the end of the sensor 161 is touched to the cam face 160 from a direction substantially perpendicular to the cam face 160 (or the axis of the shift drum 122), and it means the detection of the neutral that the sensor 161 detects the irregularities of the cam face 160.

The shift drum 122, the drum center 123, the shift drum pins 123a, the stopper plate 125, the stopper roller assembly 126, each shift fork rod 127, 128, each shift fork 129, 130, 131 respectively of the speed change gear drive 120 can be detached from the transmission case 48 as one unit in a state in which they are held in the transmission holder 48b together with the transmission 50 (see FIG. 5).

As shown in FIGS. 4 and 6, a coiled shift return spring 163 is wound on the change spindle 121. The shift return spring 163 is provided with two wire ends 163a, 163a protruded from a coil part into which the change spindle 121 is inserted in a direction of the diameter. A long hole 164 is formed in the short arm part 144 of the change arm 124 in a direction substantially perpendicular to a direction in which the short arm part is extended, and a stopper pin 165 is inserted to the left side wall 48a of the transmission case 48 substantially in the center in a direction of the length of the long hole 164 in a form protruded toward the outside of the case.

A protruded piece 166 bent toward the side of the left side wall 48a is provided to the end of the short arm part 144, and the protruded piece 166 and the stopper pin 165 are elastically held by both wire ends 163a, 163a of the shift return spring 163 in a direction in which the change arm 124 is turned. Assuming that a state in which the stopper pin 165 is located substantially in the center in the direction of the length of the long hole 164 is the neutral of the change arm 124, an angle at which the change arm 124 is turned from its neutral position with the change spindle 121 in the center is regulated corresponding to the stroke of the stopper pin 165 in the long hole 164. When the change arm 124 is turned from the neutral, pressure in a direction in which the change arm 124 is returned to the neutral is generated by the shift return spring 163.

In the engine of the motorcycle 1, as the three shafts of the crankshaft 47, the main shaft 112 and the counter shaft 118 are not arranged on the same plane and the axis of the main shaft 112 is arranged on the upside of the crankshaft 47 and the counter shaft 118, the longitudinal length of the body of the engine 15 is reduced and a degree of freedom in the design of the body is enhanced (see FIG. 2). Therefore, the speed change gear drive 120 is laid out at the diagonal back of the main shaft 112 and the counter shaft 118, as a result, the shift fork rod 127 is arranged on the diagonal upside and at the diagonal back of the main shaft 112, and the shift fork rod 128 is arranged on the diagonal upside and at the diagonal back of the counter shaft 118.

The left end of each shift fork rod 127, 128 is supported by the left side wall 48a of the transmission case 48 and the right end is supported by the transmission holder 48b. A boss 167 corresponding to each end of the shift fork rods 127, 128 is provided to the left side wall 48a and the transmission holder 48b, and each end of the shift fork rods 127, 128 is inserted into a supporting hole 168 formed in each boss 167.

The change spindle 121 is arranged so that the axis S is located on the diagonal upside and in diagonal front of an axis F of the shift fork rod 127 that supports the shift fork 130 fitted to the main shaft 112 and is arranged so that a part of the change spindle 121 is overlapped with the shift fork rod 127 when the body of the engine 15 is viewed from the side. Each position in the direction of the width of the body (the lateral direction of the body) of the concave portion 147 of the left side wall 48a that supports the base (the right end) 148 of the change spindle 121 and a boss 167b that supports the left end of the shift fork rod 128 is substantially the same.

A boss 167a that supports the left end of the shift fork rod 127 on the other side of the bottom wall 147a of the concave portion 147 is provided to the right side of the body (the inside of the case) of the concave portion 147. That is, the supporting hole 168a of the boss 167a is formed so that it is dead-end.

The boss 167a is protruded toward the right side of the body from the left side wall 48a up to a position in which the boss is overlapped with the cam groove 129a on the left side of the shift drum 122 in the direction of the width of the body. Hereby, the left side part of the shift fork rod 127 is reduced, however, as the shift fork rod 127 supports only the shift fork 130 fitted into the cam groove 130a formed substantially in the center of the shift drum 122, the boss 167a can be protruded on the right side of the body in a range in which the slid stroke of the shift fork 130 can be secured, and the shift fork rod 127 can be reduced. Therefore, the base 148 of the change spindle 121 can be supported by the left side wall 48a of the transmission case 48, and the shift fork rod 127 and the change spindle 121 can be overlapped when the body of the engine is viewed from the side.

Next, a procedure for detaching the transmission 50 from the body of the engine 15 and attaching it to the body of the engine 15 will be described.

First, when the transmission 50 is detached from the body of the engine 15, the sprocket cover 27a and the drive sprocket 27 are detached, and the clutch cover 51a and the clutch mechanism 51 are detached. As the transmission holder 48b is exposed when the clutch mechanism 51 is detached, the bolts on the periphery of the transmission holder 48b are detached, and when the transmission holder 48b is detached in the right direction of the body (the direction shown by the arrow D), the main shaft 112, the counter shaft 118 and the parts held in the transmission holder 48b of the speed change gear drive 120 are pulled out of the transmission case 48 as one unit together with the transmission holder 48b. As the stopper plate 125 and the stopper roller assembly 126 are arranged on the side of the transmission holder 48b, these are pulled out of the transmission holder 48b. Similarly, the shift drum pin 123a and the drum center 123 are also pulled out of the transmission case 48 together with the transmission holder 48b. In the meantime, the fitting of the change arm 124 fitted to the shift drum pin 123a to the shift drum pin 123a is released and the change arm is left on the side of the transmission case 48 together with the change spindle 121. That is, when the transmission 50 is detached, the shift link mechanism composed of the change arm 124, the shift lever 151 and others is not required to be detached.

When the transmission 50 is attached to the body of the engine 15, the main shaft 112, the counter shaft 118 and each part of the speed change gear drive 120 are inserted into the transmission case 48 from the right direction of the body, the left end of each shaft is made supported by the left side wall 48a of the transmission case 48, and the shift drum pin 123a is made fitted to the fitting pawl 124a of the change arm 124. In this state, when the transmission holder 48b is fixed to the transmission case 48 by the bolts, the attachment of the transmission 50 to the body of the engine 15 is completed. Afterward, the assembly of the body of the engine 15 is completed only by installing the clutch mechanism 51 and the clutch cover 51a from the right side of the transmission case 48 and installing the drive sprocket 27 and the sprocket cover 27a from the left side of the transmission case 48.

According to the above-mentioned embodiment, as the change spindle 121 and the shift fork rod 127 of the speed change gear drive 120 are arranged so that they are overlapped when the body of the engine 15 is viewed from the side, the change spindle 121 is reduced, compared with a case that the change spindle 121 is provided between both side walls of the transmission case 48 as in the conventional type. Therefore, the change spindle 121 is lightened, resistance to the operation of the change arm 124 can be reduced and control force for a shift can be reduced. Besides, as the change spindle 121 and the shift fork rod 127 are overlapped when the body of the engine 15 is viewed from the side, the speed change gear drive 120 is miniaturized, as a result, the body of the engine 15 can be miniaturized, and a degree of freedom in the design of the body can be enhanced.

Besides, as the closest shift fork 129 to the left side wall 48a that supports the change spindle 121 is supported by the shift fork rod 128, the boss 167a supporting the shift fork rod 127 of the left side wall 48a is protruded on the right side of the body (inside the case) up to a position in which the boss is overlapped with the cam groove 129a of the shift drum 122, and the shift fork rod 127 can be reduced. Therefore, as the change spindle 121 and the shift fork rod 127 are overlapped, space for the arrangement of the speed change gear drive 120 in the transmission case 48 can be effectively utilized and the speed change gear drive 120 can be lightened.

Further, as the shift drum pin 123a fitted to the change arm 124 for rotating the shift drum 122 according to the operation of the change arm 124 is provided to the drum center 123 matched and fixed with/to the left end face of the shift drum 122 and the stopper plate 125 matched and fixed with/to the right end face of the shift drum is provided to the right end face of the shift drum 122, the shift drum pin 123a for rotating the shift drum, the change arm 124 and others are arranged to one end of the shift drum 122, and the stopper plate 125 for regulating the rotational angle of the shift drum 122, the stopper roller assembly 126 and others are arranged to the other end. Therefore, each mechanism element including the change arm 124 and the stopper roller assembly 126 can be efficiently arranged, compared with a case that the shift drum pin 123a and the stopper plate 125 are collectively arranged at one end of the shift drum 122, and the speed change gear drive 120 can be miniaturized.

In the transmission 50 configured as a cartridge type transmission, as the shift drum pin 123a is arranged at the left end of the shift drum 122 and the stopper plate 125 is arranged at the right end, the stopper plate 125, the stopper roller assembly 126 and others can be arranged in the direction (in the right direction of the body) in which the transmission 50 is detached, and the shift drum pin 123a, the change arm 124 and others can be arranged on the reverse side. Therefore, the shift drum pin 123a and the change arm 124 can be detached in the lateral direction of the body and the transmission 50 can be detached without detaching the change arm 124 and the change spindle 121 from the transmission case 48. Therefore, the transmission 50 can be easily checked, can be easily replaced with a new transmission, and the maintainability can be enhanced.

The invention is not limited to the above-mentioned embodiment and for example, the axis S of the change spindle 121 and the axis F of the shift fork rod 127 may be also overlapped when the body of the engine 15 is viewed from the side. Besides, the transmission 50 is not required to be a cartridge type. Further, the shift drum pin 123a may be also arranged on the right side of the shift drum 122 and the stopper plate may be also arranged on the left side. The type of the engine is not limited to the in-line four-cylinder type and the invention can be also applied to a three-wheeled vehicle or a four-wheel vehicle and shipping.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A speed change gear drive for a transmission comprising:
    a transmission case having a side wall;
    a change pedal;
    a change spindle supported by the side wall of the transmission case and linked to the change pedal;
    a change arm fixed to the change spindle;
    a shift drum supported by the transmission case and adapted to engage the change arm;
    a shift fork arranged such that the position of the shift fork is changed by rotating the shift drum;
    a shift fork rod supported by the side wall of the transmission case and supporting the shift fork, wherein the shift fork rod and the change spindle having axes that are parallel, and where the change spindle and the shift fork rod are supported nearly end to end from opposite sides of the side wall of the transmission case such that a portion of the shift fork rod overlaps a portion of the change spindle when viewed in an axial direction.

2. The speed change gear drive for a transmission comprising:
    a transmission case including a first side wall and a second side wall;
    a change spindle supported by the first side wall of the transmission case;
    a shift drum rotatably supported by the first side wall and the second side wall;
    a first shift fork rod and a second shift fork rod, wherein each shift fork rod is supported by the first and second side walls of the transmission, and wherein each shift fork rod supports a shift fork and is operably connected to the change spindle;
    wherein the change spindle including a portion, when viewed in axially direction, overlaps with the first shift fork rod and the shift fork closest to the first side wall is supported by the second shift fork rod.

3. A transmission comprising:
    a transmission case adapted to be transversely mounted to a motorcycle, the transmission case having opposed side walls;
    a shifter;
    a spindle linked to the shifter, the spindle being rotatably supported by one of side opposed side walls of the transmission case;
    a shift fork rod disposed parallel to the spindle, where the spindle and the shift fork rod are supported nearly end to end from opposite sides of said one side wall of the transmission case such that the shift fork rod, when viewed in an axially direction, overlaps a portion of the spindle; and
    a shift fork mounted onto the shift fork rod.

* * * * *